April 13, 1965 H. M. HAWKINS ETAL 3,178,360
REMOVAL OF IMPURITIES FROM N-PENTANE
Filed Nov. 16, 1961
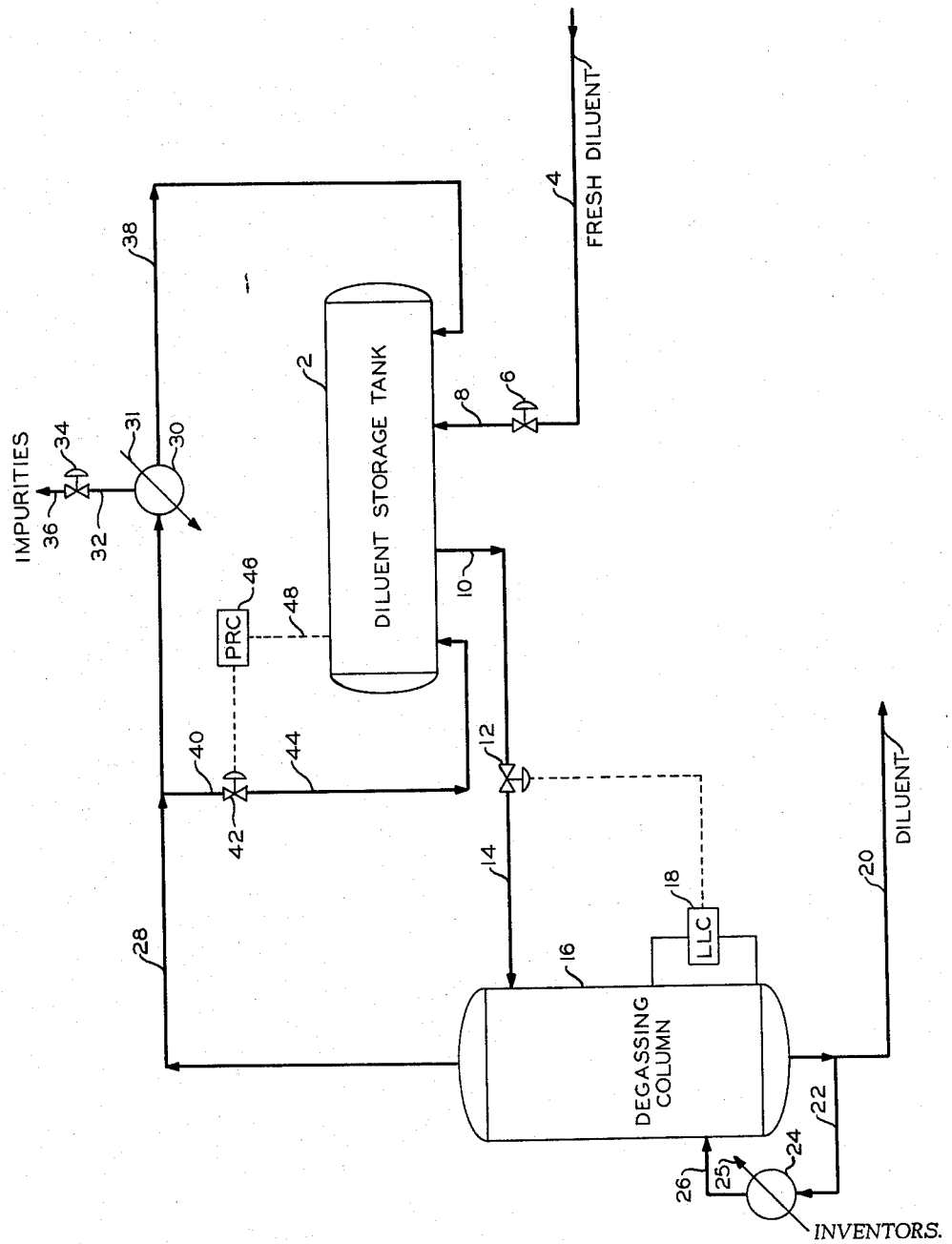
INVENTORS.
H. M. HAWKINS
J. S. SCOGGIN
L. T. PRICE
BY
*Young and Quigg*
ATTORNEYS

United States Patent Office 3,178,360
Patented Apr. 13, 1965

3,178,360
REMOVAL OF IMPURITIES FROM N-PENTANE
Harold M. Hawkins, Jack S. Scoggin, and Lowell T. Price, all of Bartlesville, Okla., assignors to Phillips Petroleum Company, a corporation of Delaware
Filed Nov. 16, 1961, Ser. No. 152,800
1 Claim. (Cl. 202—40)

This invention relates to the removal of impurities from normally fluid materials. In one aspect the invention relates to the removal of impurities from hydrocarbon diluents subsequently used in a process for the polymerization of olefins to solid polymer.

It is conventional practice to store normally fluid materials, such as hydrocarbon diluents, in a storage tank which is vented for a period of time so as to degas the diluent prior to passage of the diluent to the processing zones. However, this is a time-consuming operation and is frequently unsatisfactory for the removal of minor quantities of impurities. These minor quantities of impurities are particularly important to processes utilizing catalyst or initiator systems which are adversely affected by these impurities. The polymerization of olefins to solid polymers thereof is facilitated by the use of various hydrocarbon materials which serve as a reaction medium. Usually the solvents or diluents employed are obtained from hydrocarbon mixtures, such as fractions of petroleum, and contain various impurities which have an adverse effect on the polymerization reaction and reduce the rate of polymerization. One method for treating these diluents is described in the copending application of Robert F. Dye, Serial No. 683,463, filed September 12, 1957, entitled "Solvent Treatment for Treating the Polymerization Hydrocarbon Diluent." In this method the diluent, such as cyclohexane or pentane is contacted with an adsorbent material such as activated alumina or bauxite whereby various impurities present in the diluent are adsorbed by the alumina. The known impurities include water, oxygen in the form of air, alcohols, ethers, etc., carbonyl compounds such as acetone, sulfur in the form of organic sulfides and mercaptans, organic chlorides and the like. Although adsorbents are effective for removing a substantial proportion of the impurities from the diluent, it has been found that it is sometimes desirable to degas the diluent prior to passing the diluent to the dryer beds to improve the overall efficiency of the dryer beds and prevent their early deactivation.

This invention represents an improvement over the aforedescribed method of Robert F. Dye. It is an object of this invention to provide an improved process and apparatus for the treatment of normally fluid materials.

It is yet another object of the invention to provide an improved process and apparatus for the removal of impurities from hydrocarbon diluents.

Still another object of the invention is to provide an improved process and apparatus for increasing the purity of hydrocarbon diluents subsequently employed in the polymerization of olefins to polymers.

Yet another object of the invention is to provide a novel method and apparatus for the removal of impurities from hydrocarbon diluents subsequently contacted with an adsorbent material.

These and other objects of the invention will become more readily apparent from the following detailed description and discussion.

The foregoing objects are broadly accomplished by introducing a fluid into a storage zone, thereafter passing said fluid into a fractionating zone, fractionating said fluid into at least two fractions including a first fraction concentrated in lower boiling materials and a second fraction concentrated in the normally fluid product, removing said second fraction as the purified product, removing said first fraction, thereafter removing the lower boiling impurities therefrom and then introducing the remainder of said first fraction into said fractionating zone.

In one aspect the remainder of said first fraction is returned to said storage zone, subsequent to the removal of the impurities and prior to recycling to the fractionation zone.

In another aspect said normally fluid material is introduced into said fractionating zone as the reflux and sole feed thereto.

In yet another aspect said first fraction is removed from said fractionation zone and divided into at least two portions, a first portion being introduced into said storage zone in an amount sufficient to maintain the pressure therein within a predetermined range, a second portion being treated to separate the higher boiling fraction and the lower boiling impurities therefrom prior to returning the higher boiling fluid to the storage zone.

These methods may be accomplished by apparatus comprising, in combination: a storage vessel having an inlet and an outlet, said outlet being in open communication with a fractionating vessel, means for introducing heat into said fractionating vessel, a first outlet and a second outlet from said fractionating vessel, said first outlet for conveying purified fluid product therefrom and said second outlet for conveying overhead gases concentrated in impurities, means for removing said impurities from said second outlet, and conduit means in open communication with said means for removing impurities and said fractionating vessel so as to return thereto the overhead material less the removed impurities.

Although this invention will be described with reference to specific materials and with particular reference to the employment of a hydrocarbon diluent which is subsequently used as a solvent or diluent in a process for the polymerization of olefins to solid polymers, it is within the scope of the invention and within the skill of the art to adapt this process to the treatment of any normally fluid material including both gases and liquids for the removal of impurities therefrom.

It is known in the art that monoolefins can be polymerized in the presence of a catalyst to high molecular weight polymers. One suitable process is described in the patent to J. P. Hogan et al., No. 2,825,721, issued March 4, 1958. Other processes using different catalyst have been proposed. In most of these processes the reaction can be carried out in solution or in the presence of a hydrocarbon diluent with the catalyst being introduced to the reactor in the form of a slurry. The ethylene is flashed from the reactor effluent and the polymer is recovered from solution or from the slurry.

Frequently polymerized materials include olefins, such as ethylene, or combinations of ethylene and at least 1 other olefin. Most frequently the olefin has from 3 to 8 carbon atoms per molecule and no chain branching nearer the double bond than the 4 position. Examples of olefins which are polymerizable or copolymerizable with ethylene include: propylene, 1-butene, 1-pentene, and 1-hexene.

A number of catalysts have been described as employable for the polymerization of olefins to normally solid polymers including chromium oxide containing hexavalent chromium and silica, alumina, thoria, zirconia, or composites thereof.

Suitable diluents for such a polymerization process include paraffins having about 3 to 12 carbon atoms per molecule such as propane, isobutane, n-pentane, isopentane, isooctane, decane, dodecane and the like, preferably those paraffins having at least 5 carbon atoms per molecule. The cycloparaffins such as cyclohexane and methylcyclohexane are also suitable. In addition to the foregoing other hydrocarbon diluents which are relatively inert and in the liquid state under reaction conditions can be employed.

Many catalysts useful for the catalytic polymerization of olefins are detrimentally affected by certain materials, frequently unknown, thereby adversely affecting the polymerization reaction and reducing the polymerization reaction rate. Many of these impurities can be removed by contacting the solvent or diluent material with a suitable adsorbent, such as activated alumina or bauxite.

It has now been discovered that the efficacy of these adsorbents is improved by a process requiring the pretreating of the diluent prior to contact with the adsorbent by removing substantially all materials having a boiling point lower than that of the diluent.

The invention is best described by reference to the drawing. For purposes of simplification the drawing will be described with reference to the employment of particular materials and a particular end use of the diluent but is not limited to the use of these materials or systems alone.

Normally liquid n-pentane is introduced into the diluent storage tank 2 through conduit 4, valve 6 and conduit 8. The diluent storage tank is maintained at a pressure of 5 to 20 p.s.i.g. and a temperature of 106 to 113° F. Frequently the fresh diluent arrives by railroad car in large quantities and is transferred to the storage tank for ultimate use in the process steps. During transit, or in other ways, impurities enter into the diluent which must be removed prior to introduction of the diluent into the polymerization zone. Heretofore, it has been the practice to vent the diluent storage tank for prolonged periods of time so as to degas the n-pentane; otherwise the polymerization reaction is adversely affected during the first few days of operation. By the method of this invention, all of the diluent subsequently employed in the polymerization process is passed from the diluent storage tank 2 through conduit 10, valve 12 and conduit 14 into a degassing column or fractionating vessel 16. The flow of diluent to said degassing column 16 is controlled by liquid level controller 18 operatively connected to valve 12. The degassing column 16 is a simple fractionating tower containing a minimum number of trays sufficient to fractionate the incoming diluent into at least two fractions, the first fraction being concentrated in impurities and going overhead, the second fraction is concentrated in n-pentane and is removed from the bottom of the fractionator. For instance, when 600 gallons per hour of a mixture containing n-pentane and impurities is introduced into the upper portion of the degassing column as reflux and feed said column may be about 2.5 feet in diameter and 16 feet in height with five trays at 24 inch spacing. The degassing column may be maintained at a pressure in the range of 5 to 20 p.s.i.g. and a temperature in the range of 106 to 113° F. The temperature may be maintained by any suitable means, such as a reboiler 24. Normal pentane is removed through conduit 20 at 150 gallons per hour, a portion of the normal pentane is recycled through the reboiler via conduit 22, heat exchanger 24, heated by means of steam passing through conduit 25 and reintroduced via conduit 26 into the lower portion of the degassing column 16. Overhead at a rate of 450 gallons per hour is removed from the degassing column through conduit 28 and contains some n-pentane. The overhead gases are passed through any suitable means for removing the impurities therefrom such as a condenser 30 cooled by the passage of a heat exchange fluid through conduit 31. Many impurities, such as CO, $CO_2$, oxygen, nitrogen and the like, frequently have a lower boiling point than the diluent and are thus removable by venting to the atmosphere through conduits 32, valve 34 and conduit 36. The condensate, primarily n-pentane, is then returned to the degassing column, either directly or via conduit 38 into the diluent storage tank 2. Normal pentane is thus recycled so as to continually decrease the quantity of impurities present.

In another aspect of the invention a portion of the overhead gases in conduit 28 is separated and passed through conduit 40, valve 42 and conduit 44 back into the diluent storage tank 2 so as to maintain the pressure therein within a predetermined range. One convenient method of doing this is by the utilization of a pressure recorder controller 46 which receives a signal from a pressure sensing means 48 disposed in communication with the interior of the diluent storage tank, and then actuates valve 42 so as to control the amount of gas being diverted.

It is believed obvious that a number of adaptations of the invention are foreseeable within the scope of invention. For purposes of simplicity all pumps, bleed lines, by-pass lines and the like have been deleted from the drawing but are readily suppliable by those skilled in the art.

The thus purified n-pentane in conduit 20 may then pass to the next process step, for example, to a dryer bed, or series of dryer beds, for the further removal of remaining traces of impurities prior to passage to the polymerization reactors.

It is also to be noted that the reflux material in conduit 14 is the only feed of the n-pentane impurities stream into the degassing column; also the diluent storage tank serves not only as an accumulating vessel for the reflux material but also as the sole feed tank to the fractionating vessel.

Fresh diluent may be introduced into the diluent storage tank at will. This is an additional advantage to the invention since heretofore the addition of fresh diluent into a diluent storage tank which had been degased meant a contamination of the entire contents resulting in an increased poison level in the diluent fed to the reactor. Although the fresh diluent still contaminates the entire contents, it is inconsequential since the entire contents must pass through the degassing column to remove all lower boiling materials prior to passage to the reactor.

In a specific embodiment illustrating the method of the invention 12,000 gallons of n-pentane [1] are introduced into the n-pentane storage tank 2 maintained at 10 p.s.i.g. and 110° F. The mixture is removed at 600 g.p.h. and passed to the degassing column which is maintained at a pressure of 10 p.s.i.g. and a temperature of 110° F. One hundred and fifty gallons per hour of substantially impurity free n-pentane is removed from the bottom of the degassing column and passed to the pentane dryers. Said n-pentane contains <20 p.p.m. of impurities which are substantially all removed by subsequent passage through an activated alumina bed. Forty p.s.i.g. steam is used to heat the heat exchanger for the reboiler. Overhead gases are removed at 450 g.p.h. with 10 standard c.f.m. of impurities being removed through the vent of the n-pentane condenser. Said condenser is cooled with water at 86° F. The condensed material containing substantially impurity free n-pentane is returned to the lower portion of the storage tank. Sufficient gaseous overhead material is introduced into the pentane storage tank through conduit 44 to control the pressure therein at 10 p.s.i.g.

Although certain examples, structures, composition and process steps have been described for purposes of illustration, the invention is not limited to these. Variation and modification within the scope of the disclosure and the claim can readily be effected by those skilled in the art.

What we claim is:

A process for treating n-pentane subsequently employed as a diluent in a process for the polymerization of olefins in the presence of a catalyst, said diluent containing normally gaseous impurities detrimental to said polymerization process, comprising introducing all of said

---

[1] 97 weight percent n-pentane, 2.99 weight percent isopentane and 1000 p.p.m. impurities including CO, $CO_2$, $H_2S$, COS, air, etc.

diluent employed in the polymerization step into a storage zone, thereafter introducing all of said diluent removed therefrom into a fractionating zone as reflux and the sole feed thereto wherein said n-pentane is fractionated into at least two fractions including a first fraction concentrated in lower boiling impurities and a second fraction concentrated in said n-pentane, said n-pentane being removed in the bottoms therefrom as liquid product, said first fraction being removed therefrom as overhead gases, dividing said overhead gases into two portions, a first portion being introduced into said storage zone in an amount sufficient to maintain the pressure therein within a predetermined range, a second portion being cooled to condense the n-pentane and removing the lower boiling impurities as gases therefrom prior to returning the condensate to the storage zone.

References Cited by the Examiner
UNITED STATES PATENTS

| | | | |
|---|---|---|---|
| 1,899,081 | 2/33 | Denney | 202—161 |
| 2,351,445 | 6/44 | Morgan | 208—301 |
| 2,423,795 | 7/47 | Patterson | 202—60 |
| 2,568,522 | 9/51 | Steitz et al. | 202—60 |
| 3,039,941 | 6/62 | Sweeney et al. | 202—40 |

NORMAN YUDKOFF, *Primary Examiner.*

GEORGE D. MITCHELL, ALPHONSO SULLIVAN,
*Examiners.*